No. 861,645. PATENTED JULY 30, 1907.
P. GALLAGHER.
INTERLOCKING LOCKING ATTACHMENT FOR MILK RECEPTACLES.
APPLICATION FILED APR. 2, 1907.
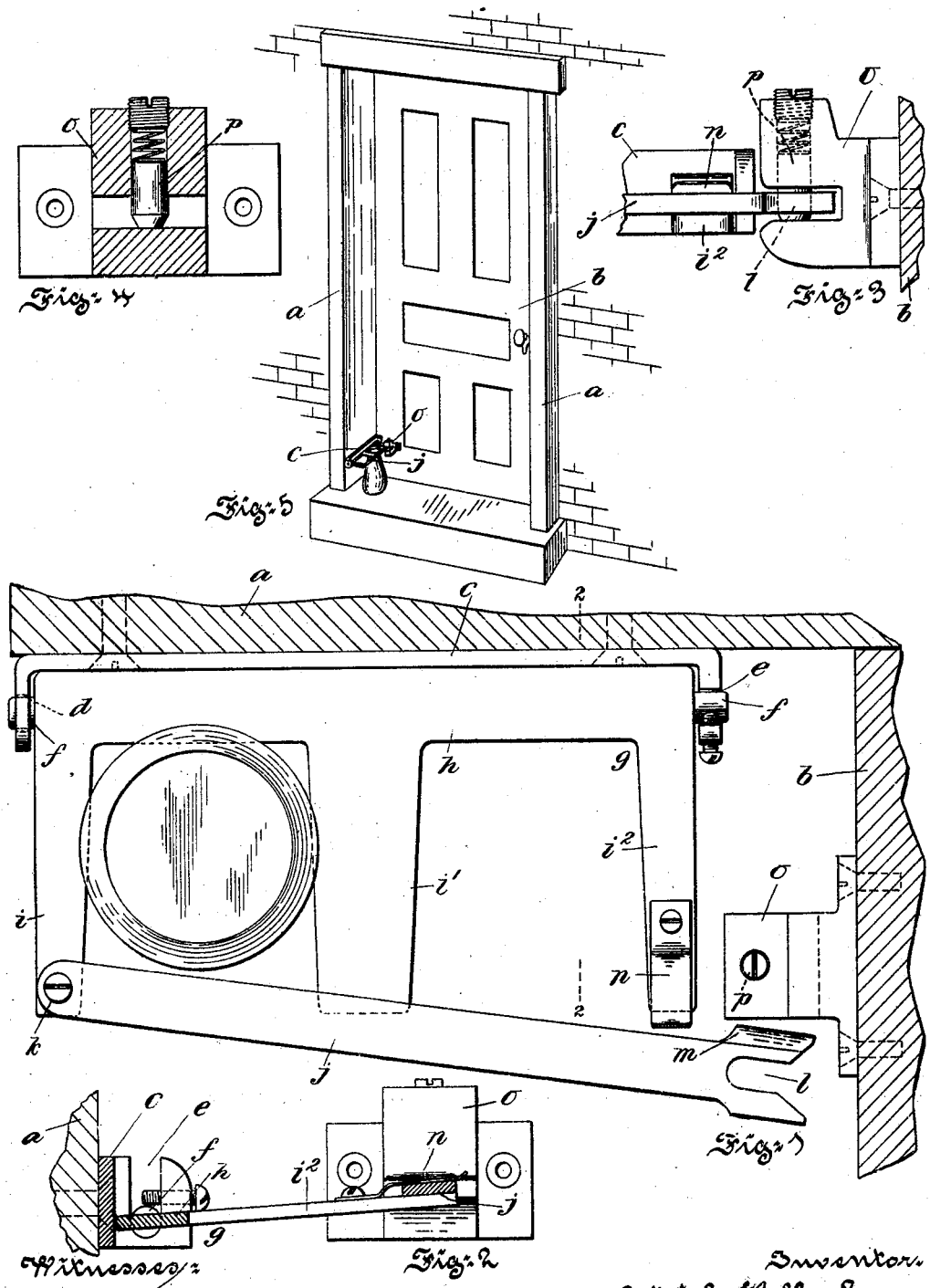

UNITED STATES PATENT OFFICE.

PATRICK GALLAGHER, OF PHILADELPHIA, PENNSYLVANIA.

INTERLOCKING LOCKING ATTACHMENT FOR MILK-RECEPTACLES.

No. 861,645.　　　　Specification of Letters Patent.　　　Patented July 30, 1907.

Application filed April 2, 1907. Serial No. 366,026.

*To all whom it may concern:*

Be it known that I, PATRICK GALLAGHER, a citizen of the United States, and resident of Philadelphia, in the county of Philadelphia and State of Pennsylvania, have invented a certain new and useful Interlocking Locking Attachment for Milk-Receptacles, of which the following is a specification.

This invention relates to devices for preventing milk receptacles from being stolen or the contents thereof being abstracted by unauthorized persons, and the principal object of the present invention is to provide interlocking means carried jointly by the door-jamb and door whereby milk receptacles may be readily positioned and locked by the dispenser of the commodity upon the street and may only be removed therefrom when the house door is opened.

To this and other ends hereinafter set forth the invention comprises the improvements to be presently described and finally claimed.

The nature, characteristic features and scope of the invention will be more fully understood from the following description taken in connection with the accompanying drawings forming part hereof, and in which Figure 1, is a top or plan view, partly in section, of the device embodying the invention. Fig. 2, is a sectional view taken approximately on the line 2—2 of Fig. 1. Fig. 3, is an elevational view of the right hand side of Fig. 1. Fig. 4, is a detail view, partly in elevation and partly in section, of the slotted guide carried by the door, and Fig. 5, is a perspective view of a house door and door-jamb illustrating the application of the invention thereto.

In the drawings there is shown a door-frame having door-jambs $a$, and hinged thereto as usual a door $b$. Secured to one of the door-jambs $a$, is an elongated bracket $c$, having side arms of which one is provided with an opening $d$, and the other is slotted as at $e$, for the reception of the trunnions $f$, of a forked retainer $g$, secured against displacement as by a set screw, as shown. This retainer is shown as being in one piece and comprising the rear strip $h$, which carries the trunnions $f$, and the forwardly extending fingers $i$, $i^1$, and $i^2$. The space between these fingers is reserved for milk receptacles, the necks of which are flanged, and this flanged part of the receptacle is adapted to rest upon the rear strip $h$, fingers $i$, $i^1$ or $i^2$, and also upon the pivotal arm $j$. One end of the arm is shown as being pivoted as at $k$, to the finger $i$, and having its other end bifurcated to form a slot 1. This bifurcated portion of the arm is also equipped with a beveled or wedge-shaped projection $m$, for a purpose to be presently described. The finger $i^2$, has a spring $n$, adapted to coöperate with and hold the arm $j$, when the above described parts, on account of their pivotal relation with the door-jamb are swung back out of use, against the same in vertical position. While in the drawings, this swinging portion of the device is shown as being located at a height conforming approximately to the height of a milk receptacle so that the same may rest upon the door stoop and be grasped and locked to place, it will be understood that milk receptacles may be suspended and held by such a device clear of the stoop. In swinging the described parts to normal position the rear strip $h$, abuts against the bracket $c$, and serves to keep the fingers in horizontal position.

Fixed to the door $b$, is a slotted guide $o$, arranged so that the slotted portion thereof is in alinement with and acts as a guide for the pivotal arm $j$.

Mounted vertically of the guide and traversing the slotted portion thereof is a spring controlled detent $p$, which is adapted to be elevated as the wedge-shaped projection of the pivotal arm $j$, passes thereunder and springs back to place intermediate of the bifurcated portion of said arm, or in other words within the slotted portion, thus securely interlocking the parts.

It is customary for milkmen to deliver milk in glass receptacles to retail customers at the doors of houses, prior to the awakening of the occupants thereof. In such case the milkman upon finding a device of the character described would unclasp the arm $j$, from the spring $n$, swing the forked portion of the device into normal or operative position, place one or more receptacles between the fingers and swing the arm $j$, to place, by causing the same to be engaged by the spring detent $p$. Thus the milk or cream supply will be safe from molestation by unauthorized persons and may be released only upon the opening of the house door $b$, when obviously the detent is withdrawn from the slotted end of the arm $j$.

I do not intend by the use of the above language or words to limit my invention further than the prior state of the art may require, but

Having thus described the nature and objects of my invention, what I claim as new and desire to secure by Letters Patent is:

1. A device of the character designated comprising pivotally arranged means adapted to be secured to the jamb of a door frame and grasp the neck of a receptacle, and spring controlled means carried by the door adapted to coöperate with and interlock one with the other the said means when the door is closed.

2. A device of the character designated comprising a pivotally arranged and forked retainer adapted to be secured to the jamb of a door frame and grasps the neck of a receptacle, an arm having pivotal relation with the retainer, the outer end of said arm being slotted, and means carried by the door equipped with a spring controlled detent for interlocking one with the other the slotted arm and detent.

3. A device of the character designated comprising a bracket adapted to be fixed to the jamb of a door frame, a forked retainer having pivotal relation therewith, a bifurcated arm pivoted to said retainer said arm having a wedge-like projection at its outer end, a slotted guide fixed to the door, and a spring controlled detent traversing the said slotted portion and adapted to coöperate with and interlock one with the other the retainer and arm with the guide when the door is closed.

In testimony whereof I have hereunto signed my name.

his
    PATRICK × GALLAGHER.
       mark

Witnesses:
 W. J. Jackson,
 Paul V. Connolly.